(12) United States Patent
Boussard et al.

(10) Patent No.: US 10,590,669 B2
(45) Date of Patent: Mar. 17, 2020

(54) MOVABLE CONVEYORS FOR MOVING A FOUR-WHEEL VEHICLE

(71) Applicant: STANLEY ROBOTICS, Versailles (FR)

(72) Inventors: Clément Boussard, Paris (FR); Aurélien Cord, Paris (FR)

(73) Assignee: Stanley Robotics, Versailles (FR)

( * ) Notice: Subject to any disclaimer, the term of this patent is extended or adjusted under 35 U.S.C. 154(b) by 0 days.

(21) Appl. No.: 15/575,720

(22) PCT Filed: May 19, 2016

(86) PCT No.: PCT/FR2016/051195
§ 371 (c)(1),
(2) Date: Nov. 20, 2017

(87) PCT Pub. No.: WO2016/189233
PCT Pub. Date: Dec. 1, 2016

(65) Prior Publication Data
US 2018/0142488 A1 May 24, 2018

(30) Foreign Application Priority Data
May 20, 2015 (FR) ...................................... 15 54528

(51) Int. Cl.
*E04H 6/36* (2006.01)
*E04H 6/18* (2006.01)
(Continued)

(52) U.S. Cl.
CPC ................ *E04H 6/36* (2013.01); *B60S 13/00* (2013.01); *B62D 65/18* (2013.01); *E04H 6/182* (2013.01); *E04H 6/305* (2013.01); *E04H 6/424* (2013.01)

(58) Field of Classification Search
CPC ............ E04H 6/36; E04H 6/183; E04H 6/305
See application file for complete search history.

(56) References Cited

U.S. PATENT DOCUMENTS 2,899,087 A * 8/1959 Jacobsen ................. E04H 6/183
254/2 R
4,968,208 A * 11/1990 Friberg ................... E04H 6/183
414/256
(Continued)

FOREIGN PATENT DOCUMENTS

| CN | 2399477 Y | 10/2000 |
|---|---|---|
| DE | 1045075 B | 11/1958 |

(Continued)

*Primary Examiner* — Jonathan Snelting
(74) *Attorney, Agent, or Firm* — Harness, Dickey & Pierce, PLC

(57) ABSTRACT

The disclosure relates to a conveyor for moving four-wheel vehicles. The conveyor includes a chassis having stowable extensions movable between a position in which the extensions make it possible to move the chassis under the vehicle and a position in which the extensions make contact with the treads of the wheels. The chassis is telescopic and includes two segments that each have a pair of arms. At least one of the arm pairs is hinged so as to enable movement between a position perpendicular to the longitudinal axis of the chassis with an extension at least equal to the track width of the vehicle and a folded-up position that is to occupy a width less than the distance between the inner flanks of the wheels of the vehicle. The segments are movable between a position where the arms are not in contact with the wheels and a position where each arm makes contact with the tread of one of the wheels so as to raise or lower the vehicle.

12 Claims, 5 Drawing Sheets

(51) Int. Cl.
  *E04H 6/30* (2006.01)
  *B60S 13/00* (2006.01)
  *B62D 65/18* (2006.01)
  *E04H 6/42* (2006.01)

(56) References Cited

U.S. PATENT DOCUMENTS

| | | | | |
|---|---|---|---|---|
| 5,037,263 | A * | 8/1991 | Yamashita | E04H 6/183 |
| | | | | 414/252 |
| 5,286,156 | A * | 2/1994 | Ikenouchi | E04H 6/183 |
| | | | | 414/253 |
| 5,320,473 | A * | 6/1994 | Arnold | E04H 6/183 |
| | | | | 414/253 |
| 7,002,487 | B1* | 2/2006 | Montgomery, Sr. | E04H 6/426 |
| | | | | 340/932 |
| 7,736,113 | B2* | 6/2010 | Yook | E04H 6/183 |
| | | | | 414/256 |
| 7,740,438 | B2* | 6/2010 | Xiang | E04H 6/183 |
| | | | | 414/227 |
| 9,017,000 | B2* | 4/2015 | McDowell, Jr. | E04H 6/183 |
| | | | | 414/256 |
| 9,702,159 | B2 | 7/2017 | Meirer et al. | |
| 2009/0180851 | A1* | 7/2009 | Manzotti | E04H 6/183 |
| | | | | 414/350 |
| 2010/0086385 | A1 | 4/2010 | Shani | |
| 2010/0289250 | A1* | 11/2010 | Fankhauser | B60G 3/14 |
| | | | | 280/490.1 |
| 2013/0166105 | A1* | 6/2013 | Wastel | E04H 6/24 |
| | | | | 701/2 |

FOREIGN PATENT DOCUMENTS

DE   1228390 B   11/1966
WO   WO-2005/059276 A1   6/2005

* cited by examiner

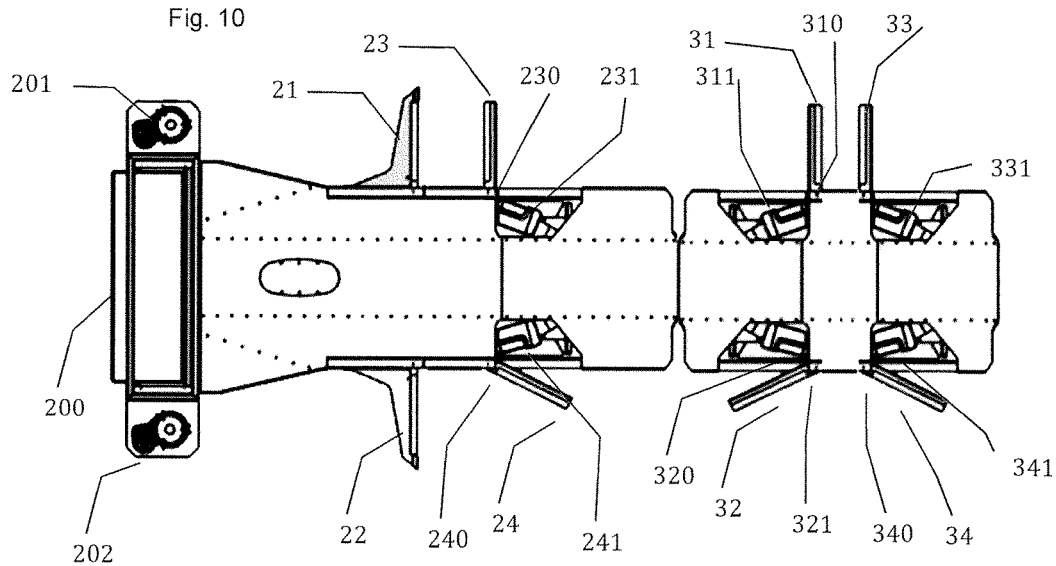
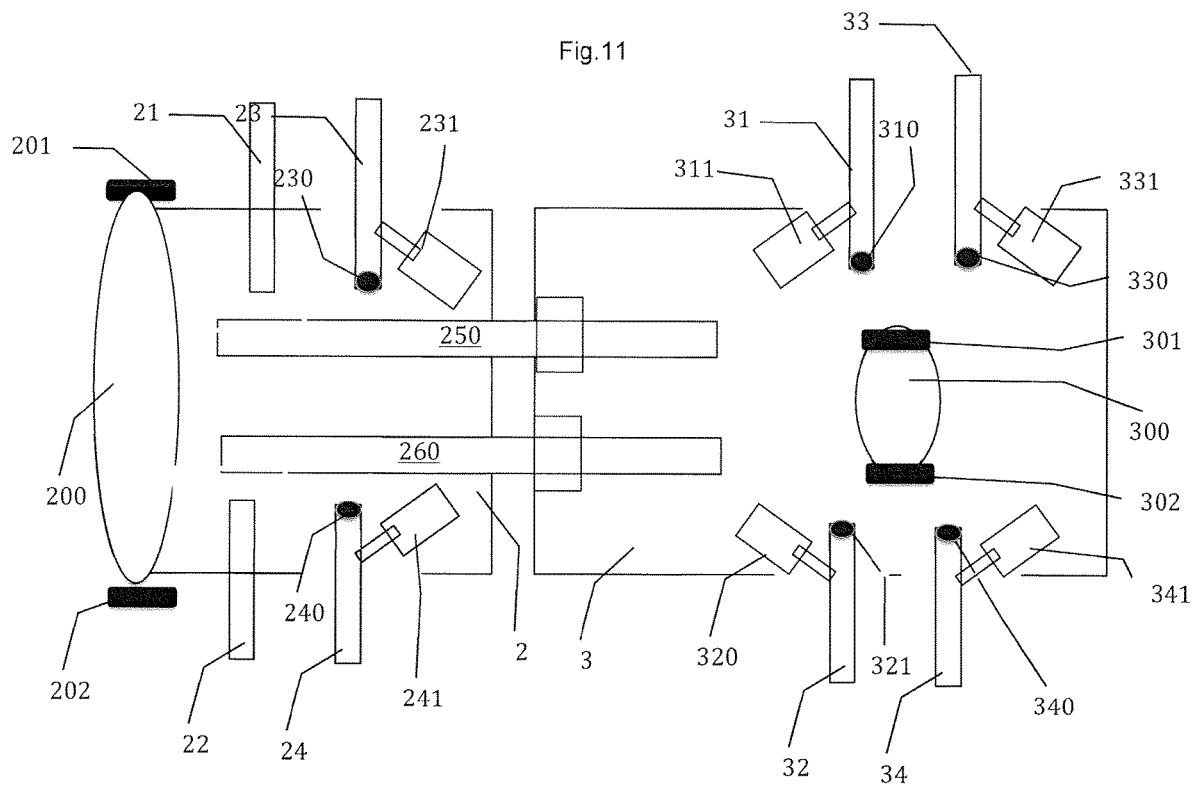

MOVABLE CONVEYORS FOR MOVING A FOUR-WHEEL VEHICLE

CROSS REFERENCE TO RELATED APPLICATIONS

This application is a National Phase Entry of International Patent Application No. PCT/FR2016/051195, filed on May 19, 2016, which claims priority to French Patent Application Serial No. 1554528, filed on May 20, 2015, both of which are incorporated by reference herein.

TECHNICAL FIELD

The present invention relates to the field of movable conveyors intended to haul a four-wheel vehicle, in particular—but not exclusively—for automatic vehicle parking or hauling of motor vehicles during manufacture. Such conveyors generally comprise a movable frame fitted with a pair of forks that are introduced under the vehicle and then raised so that the vehicle's wheels no longer are in contact with the ground. The conveyor can then haul the vehicle to a new location where it is set down by lowering and removing the forks.

BACKGROUND

The European patent EP2614198, which describes a device for storing a motor vehicle that is able to move transversely in relation to its longitudinal axis on a storage site, is known in the state of the art. This driverless device comprises a motorized frame that is parallel to the longitudinal axis of the vehicle. A pair of forks are moved horizontally to fit in on one side of the vehicle's wheels.

The German patent DE1228390 describes a device consisting of a platform supporting two transversely movable straddle arms, each extended by movable lateral arms that come into contact with the tread of each wheel. This platform is mounted on castors for moving the vehicle along a path formed in a pit. The Chinese utility model CN2399477 describes a parking device consisting of a straddle arm of constant length supporting a first fixed subframe and two movable subframes each actuated by a cylinder.

Also known is the patent application WO2005/059276, which describes a truck and a parking system using this truck to transport passenger cars and the like. The truck of the present invention comprises a main body that can be moved and blocking means having at least a first and a second movable plate and at least one pair of locking jaws. The parking system of the present invention comprises a loading table, a differential table that is movable in relation to the loading table, a truck that is movable in relation to the differential table, a longitudinal drive mechanism, a linear power tube transmission mechanism, and a motorized valve station combined with an electrical control system. The truck of the present invention has a simple structure and facilitates flexible and automatic positioning, it allows locking and lifting passenger cars or vehicle chassis of various wheelbases, and it enables bidirectional transport as well as stowage or retrieval of passenger cars. Furthermore, U.S. Patent Publication No. 2010/0086385, which describes another example of a vehicle moving device within a parking lot, is also known.

The side-loading solution such as that described in patent EP2614198 requires a large space on the side of the vehicle to be able to approach the transport device, place it parallel to the vehicle and actuate the forks that lift the vehicle. The solution described in the German patent DE1228390 implies a certain height for the assembly, formed by the platform, the longitudinal straddle arms and the castors, that does not allow for it to be introduced under modern vehicles whose ground clearance does not exceed a few centimetres.

The solution described by utility model CN2399477 requires two subframes to be moved, with two independent cylinders, each of these subframes having castors, making it very difficult to move and guide the device. Yet, the manoeuvrability of the device is essential for an application such as vehicle storage in a parking lot and it requires the ability to move with very small radii of curvature. The solution proposed by utility model CN2399477 enables rectilinear movement, or at best with a very large turning radius, making it impossible to move in restricted spaces such as a car park where one seeks to optimize space and increase vehicle density. These solutions of the prior art are therefore not suitable for driverless movement of a four-wheel vehicle in a simple, robust and reliable manner.

SUMMARY

In order to address these drawbacks, the present invention relates, in its most general sense, to a conveyor for moving four-wheel vehicles, comprising a frame provided with arms that are movable between a position in which they allow said frame to be moved under the vehicle, and a position in which they come into contact with the treads of said wheels, characterized in that said frame is telescopic and comprises two segments each carrying a pair of arms, the at least one of the pairs of arms being articulated to allow movement between a position perpendicular to the longitudinal axis of the frame with an extension at least equal to the vehicle's track width, and a folded-up position that is to occupy a width less than the distance between the inner sidewalls of the vehicle's wheels, said segments being movable between a position in which the arms are not in contact with the wheels, and a position in which each arm makes contact with the tread of one of said wheels, so as to raise or lower the vehicle.

The height of the frame and the elements that it supports, for the part intended to be introduced under the vehicle to be transported, is determined to be lower than the vehicle's ground clearance.

According to a first variant, said pair of articulated arms is transversely movable. According to a second variant, said pair of articulated arms is movable through pivoting. According to a first mode of implementation, said raising of the vehicle is ensured by the interaction, on either side of the vehicle, between the rear arm with the rear of the tread area of the rear wheel on the one hand, and, on the other, between the front arm with the front of the tread area of the front wheel.

Within the meaning of this patent, the term "rear" is to be taken in relation to the conveyor's normal direction of travel. When the vehicle is loaded "back to front" the front wheels of the vehicle will be referred to as the "rear wheels" within the meaning of this patent.

According to a second mode of implementation, said raising of the vehicle is ensured by the interaction, on either side of the vehicle, between the rear arm with the front of the tread area of the rear wheel on the one hand, and, on the other, between the front arm with the rear of the tread area of the front wheel. According to a third mode of implementation, said raising of the vehicle is ensured by the interaction between one of said arms with one of the portions of a wheel's tread and an additional arm coming into contact with an opposite portion of the same wheel's tread.

The invention also relates to an automatic parking system comprising at least one conveyor for moving four-wheel vehicles, comprising a frame provided with arms that are movable between a position in which they allow moving said frame under the vehicle, and a position in which they come into contact with the treads of said wheels, characterized in that said frame is telescopic and comprises two segments each carrying a pair of arms, the at least one of the pairs of arms being articulated to allow movement between a position perpendicular to the longitudinal axis of the frame with an extension at least equal to the vehicle's track width, and a folded-up position that is to occupy a width less than the distance between the inner sidewalls of the vehicle's wheels, said segments being movable between a position in which the arms are not in contact with the wheels, and a position in which each arm makes contact with the tread of one of said wheels, so as to raise or lower the vehicle.

Advantageously, said automatic parking system of the preceding claim characterized in that it comprises a computer for controlling the haulage of the conveyor under the chassis of a vehicle, by a displacement of said conveyor along the longitudinal axis of said vehicle, then raising the vehicle by moving said conveyor segments and arms, then hauling the conveyor to a destination location, and then releasing the vehicle by moving the arms and removing the conveyor by a displacement along the longitudinal axis of the vehicle.

BRIEF DESCRIPTION OF THE DRAWINGS

The present invention will be best understood when reading the following detailed description thereof, which refers to a non-restrictive exemplary embodiment, illustrated by the appended drawings, wherein:

FIGS. 10 to 11 show schematic views corresponding to the alternative embodiment of the invention in FIG. 9.

DETAILED DESCRIPTION

Figure 1:
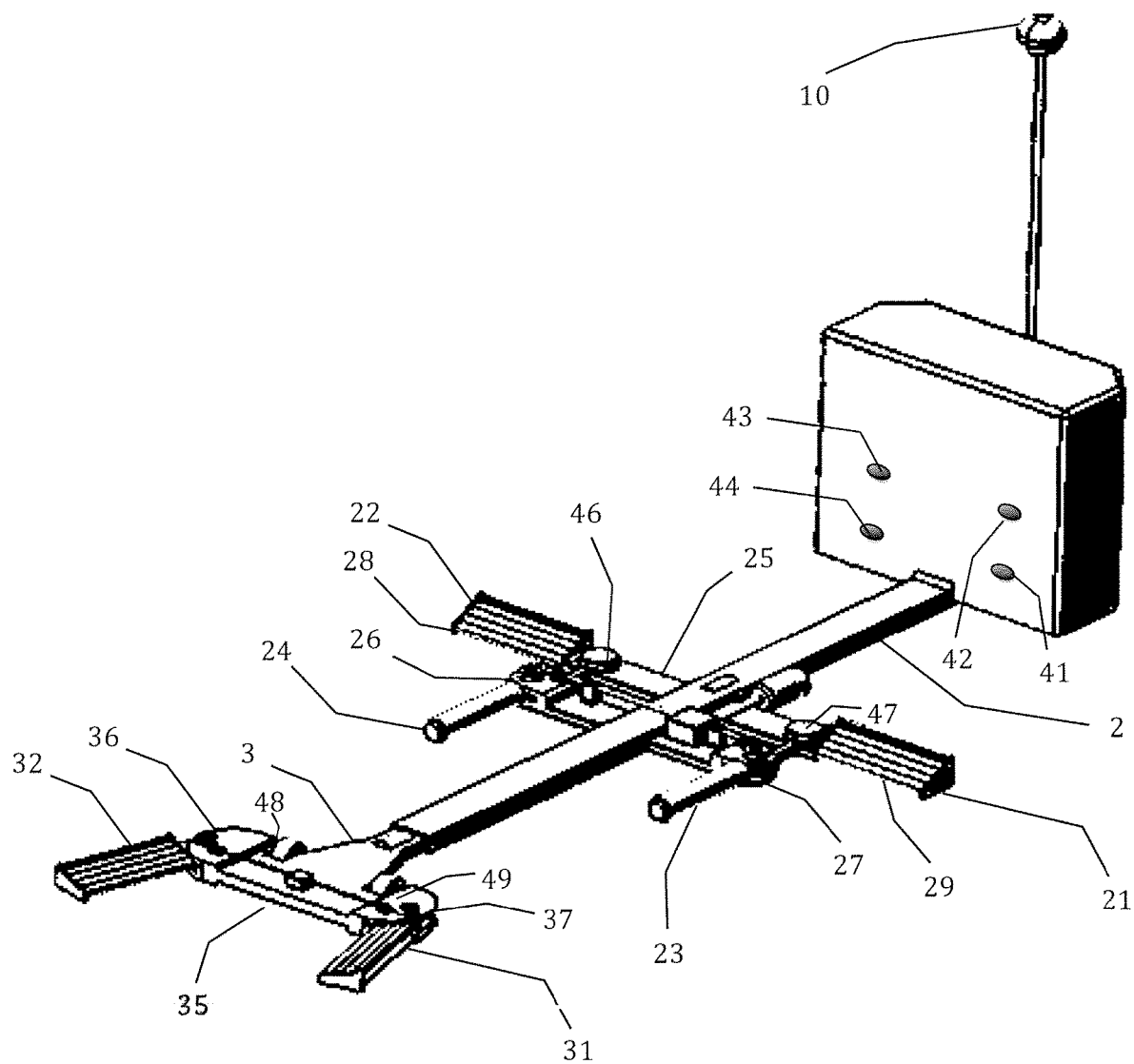
FIG. 1 shows a schematic perspective view of a conveyor according to an exemplary embodiment of the invention.

FIG. 1 shows a perspective view of an exemplary conveyor according to the invention. It comprises a front block (1) enclosing a motor driving a single steering wheel (alternatively, two steering wheels can be provided). This front block (1) also contains the electronic circuits and a computer handling the autonomous guidance of the conveyor. This front block (1) is topped by a wide-angle laser range finder (10) providing real-time information to the computer.

A telescopic arm (2) extends towards the rear from this front block (1). A retractable part (3) of this arm is actuated by a cylinder or a linear actuator, e.g. a worm gear.

The first segment of the arm (2) has a front transverse arm (25) that is fixed and which supports two fixed extensions (21, 22), as well as two stowable extensions (23, 24), rotatable in relation to pivots (26, 27). They are driven by cylinders, to be able to move between a cleared position, when loading the vehicle, and a locking stowed position, when transporting the vehicle. In the stowed position, the spacing of the extensions (21, 23) and (22, 24) is determined so as to come into contact with the front and rear sidewalls of the vehicle's tyre and by clutching it to ensure the vehicle is raised. To this end, the front extensions (21, 23) have an inclined ramp (28, 29). When the extensions (22, 23) are folded into the locking position, they prevent the vehicle from moving in relation to the conveyor.

The rear part (3) of the arm (2) also comprises a transverse arm (35) extended by two extensions (31, 32) that can be moved in relation to pivots (36, 37). When loading the vehicle, these extensions (31, 32), as well as extensions (21, 22), are adjusted substantially longitudinally, parallel to the main axis of the arm (2). The length L of the arms (25, 35), measured respectively between pivots (26, 27) and (36, 37) is less than Vmin−Lmin, where:

$V_{min}$ refers to the usual and minimal track of a car, typically 1,600 millimetres $L_{min}$ refers to the usual width of a car's tyre, typically 220 millimetres.

The length L of the arms is therefore typically less than 1,400 millimetres, and preferably of the order of 1,200 millimetres. The length of the fixed (21, 22) and movable (23, 24), (33, 34) extensions is determined to be half the width lmax corresponding to the width of a large car less the length of the arm (25, 35), typically 500 millimetres for each of the extensions.

The conveyor can thus be placed in the axis of the vehicle to allow for the free passage of the arm (2) under the vehicle's chassis with the extensions (23, 24, 33, 34) in folded-up position, adjusted substantially longitudinally, until the ramps (28, 29) of the fixed arms (20, 21) come to rest against the front wheels of the vehicle. The extension (3) of the arm (2) is moved to adjust to the wheelbase of the car to be loaded. The extensions (23, 24, 33, 34) are then moved to come into a transverse position, in contact with the rear sidewalls of the vehicle's wheels.

The extension (3) is then driven forward to ensure that the vehicle's wheels are locked. The front block (1) comprises four ultrasonic telemetry sensors (41 to 44) delivering signals according to the distance of the vehicle's bumper. The front arm (25) comprises two force sensors (46, 47) to detect and confirm that the vehicle has been grasped. The rear arm (35) includes two short-range scanning laser telemetry sensors (48, 49) to detect the wheels and any obstacles. The frame formed by the arm (2, 3) and the arms (25, 35) has castors or rollers to enable rolling on the ground.

Figure 2:
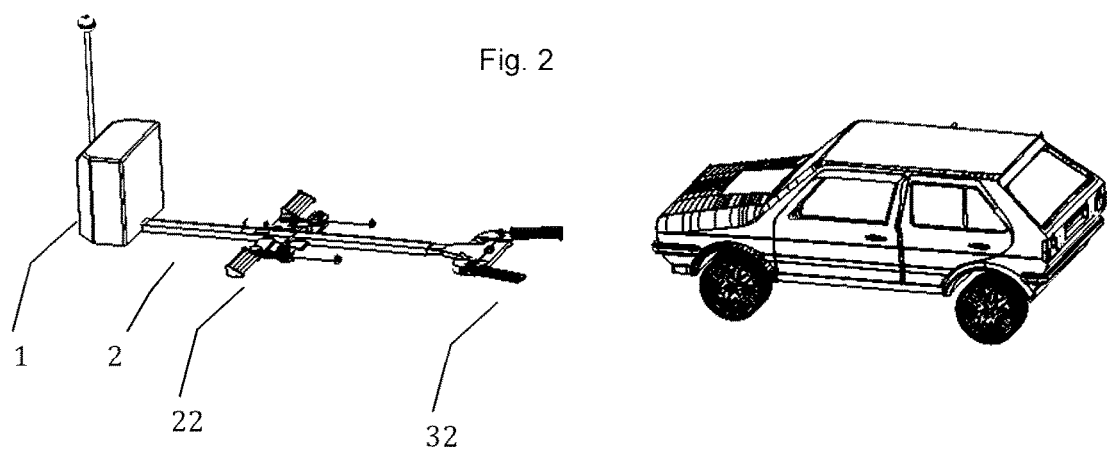
FIGS. 2 to 8 show schematic views of the vehicle and of the conveyor at successive stages of loading.
Figure 3:
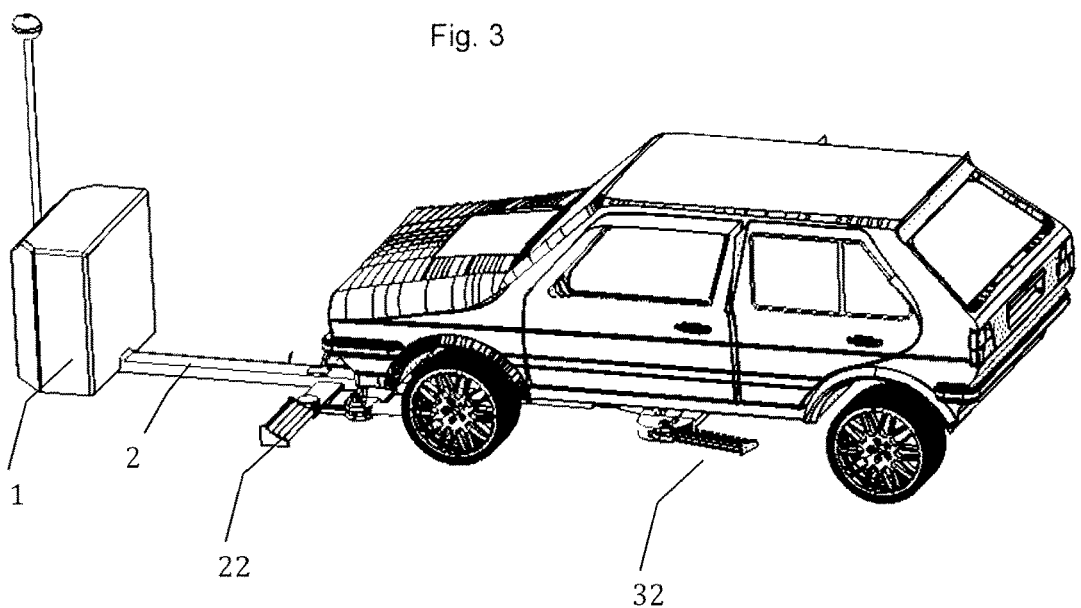
Figure 4:
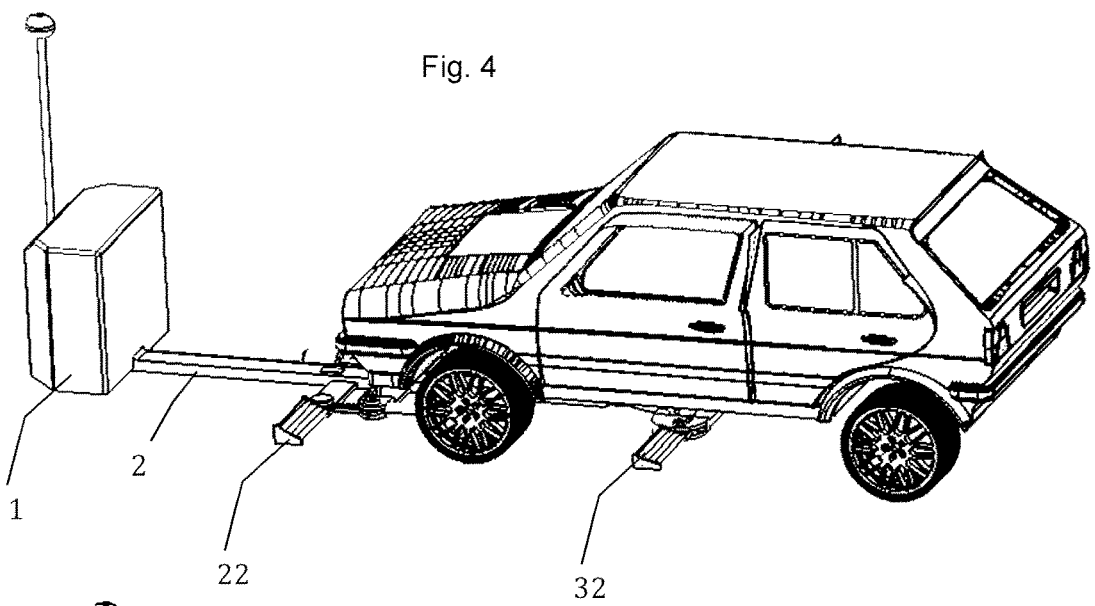

FIGS. 2 to 8 show schematic views of the vehicle and of the conveyor at successive stages of loading. As shown in FIG. 2, the conveyor is initially correctly placed in front of the car, which is parked at a stowage location. The movable arms (22, 23, 32, 33) are folded into the longitudinal position.

The laser range finder (10) provides information to control the placement of the conveyor. The short-range laser range finders (46, 47) detect the front wheels of the vehicle. The conveyor aligns itself with the car.

In the next step (FIG. 3), the conveyor places the arm (2) under the car, while aligning, lengthwise, the axis of the arm (2) and the longitudinal axis of the vehicle. The ultrasonic range finders (41 to 43) detect the vehicle's bumper to control the stopping of the conveyor's relative movement with respect to the vehicle. The short-range laser range finders (48, 49) detect the rear wheels of the vehicle.

Figure 5:
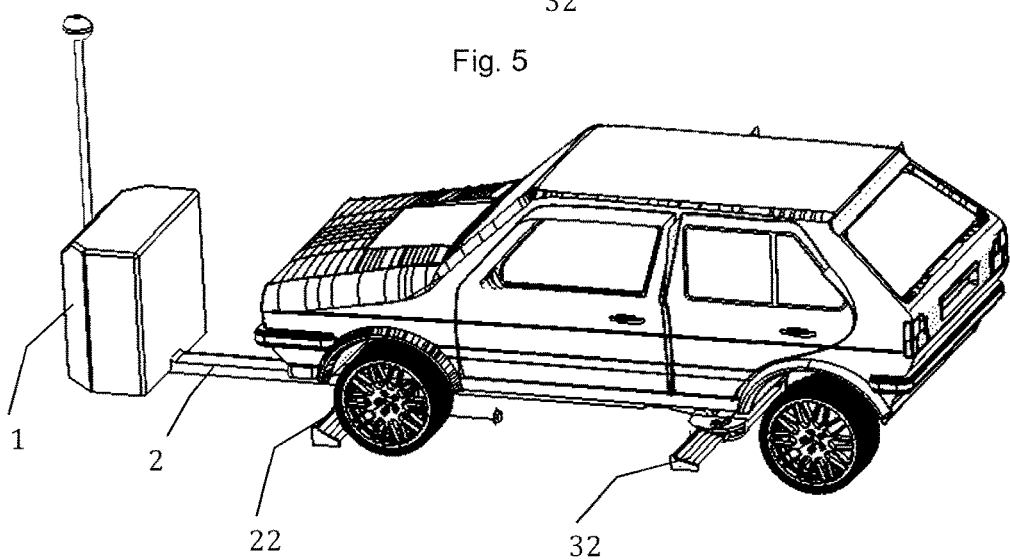
Figure 6:
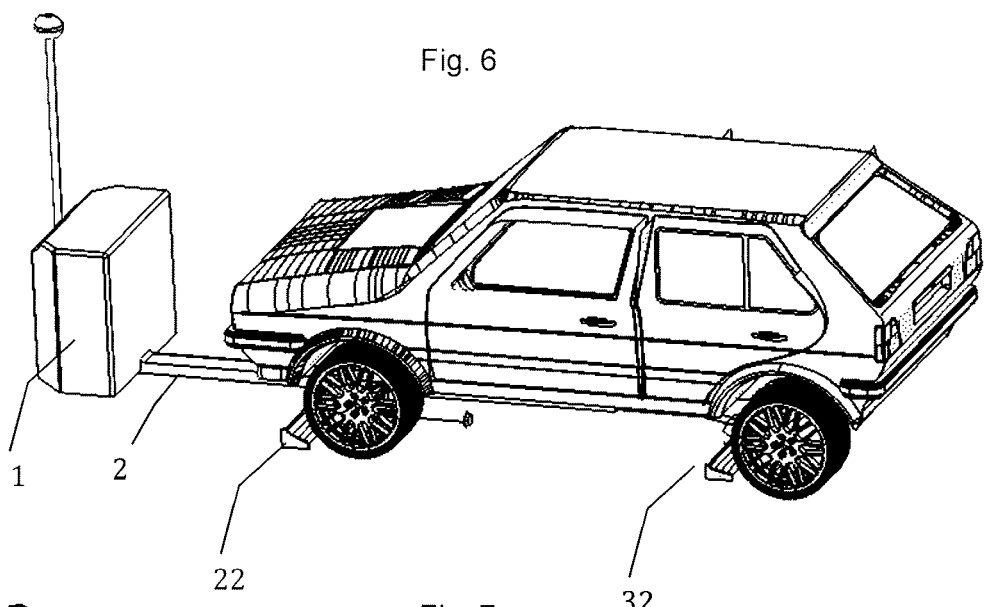
Figure 7:
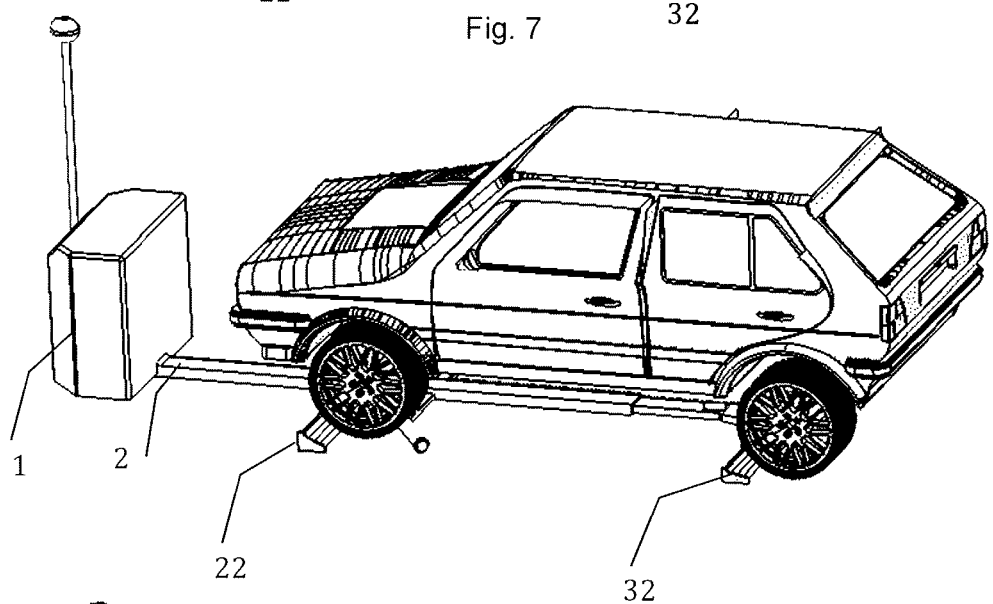
Figure 8:
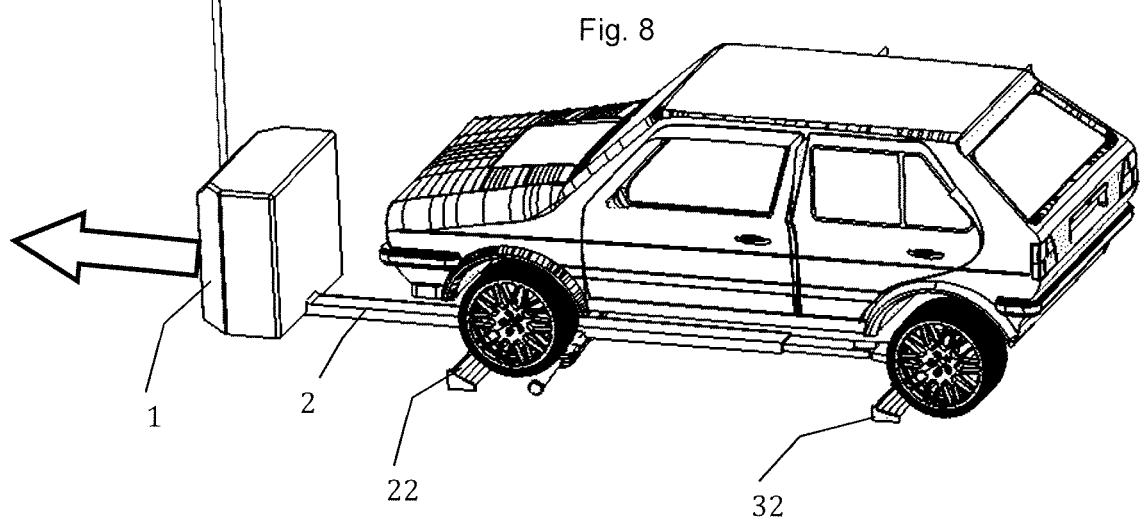

In the next step (FIG. 4), the movable rear extensions (32, 33) are stowed in a transverse position. The conveyor then advances until the fixed forward extensions (22, 23) come into contact with the front wheels (FIG. 5). The arm (2)

adjusts its length according to the length of the front overhang estimated by the ultrasonic range finders (41 to 44).

The force sensors (46, 47) indicate that the wheels are in contact. The conveyor then adjusts (FIG. 6) the length of the rear arm (3) so that the rear extensions (32, 33) touch the rear wheels. The force sensors (48, 49) indicate that the wheels are in contact.

The movable extensions (23, 24) clamp the front wheels and raise the car onto the front and rear rollers (FIG. 7), causing the vehicle to rise. The force sensors (48, 49) confirm that the car is mounted on the rollers (FIG. 8), and the conveyor is moved automatically to take the vehicle to the target location. The laser range finder (10) will detect obstacles. It performs an emergency stop of the robot, if necessary.

Alternative Embodiment

Figure 9:
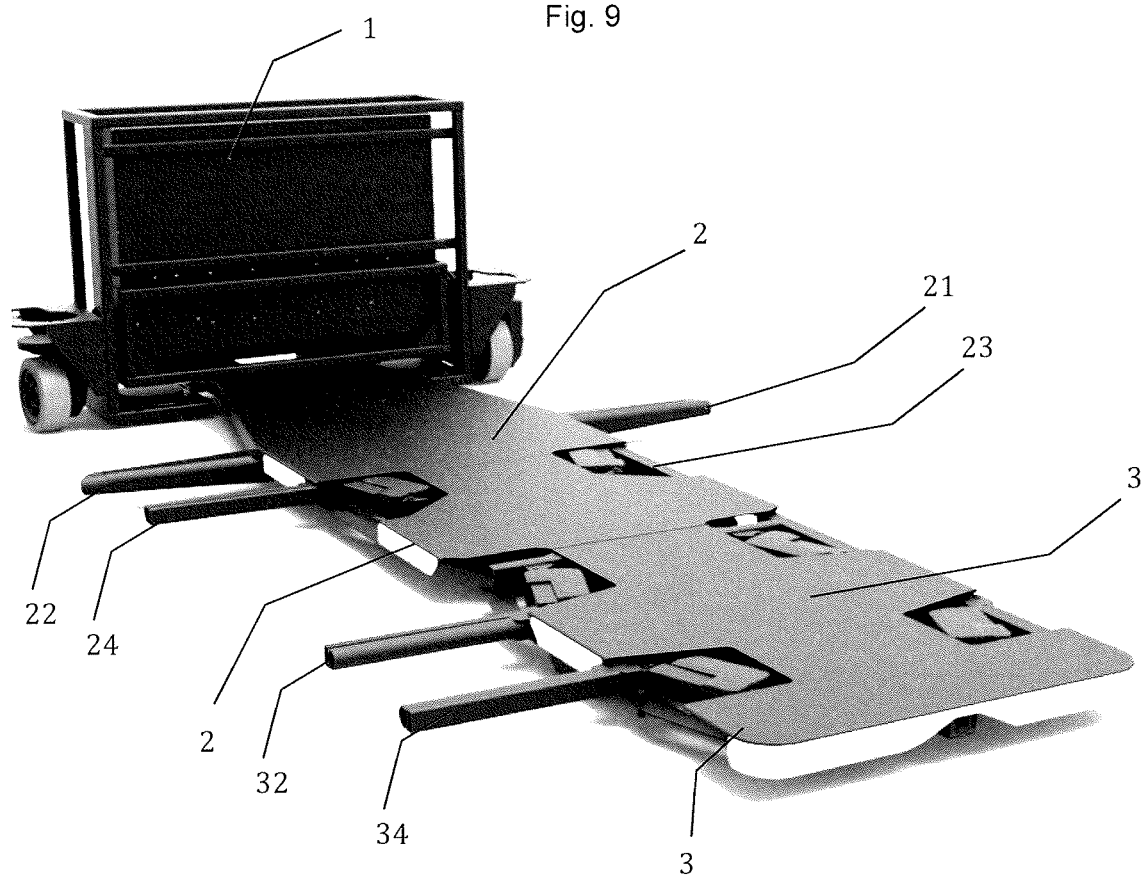
FIG. 9 shows a perspective view corresponding to an alternative embodiment of the invention.

FIGS. 9 and 11 show an alternative embodiment in which the vehicle is lifted using lifting bags (200, 300). The conveyor consists of a frame formed of two casings (2, 3) about 50 millimetres thick, connected by a pair of ROLLON-type (trademark) recirculating ball-profiled rails (250, 260). The frame thus forms a stowable platform consisting of a first segment (2) integral with the motorized block (1), and a second segment (3) that can be moved away through the action of an electric or pneumatic cylinder using the recirculating ball-profiled rails (250, 260).

The frame only consists of two stowable parts to allow for it to be adapted to the wheelbase of the vehicle to be moved. The segment (3) is provided with a pivoting plate (300) comprising light-running castors (301, 302). A lifting bag or mechanism is inserted between the structure of the segment (3) and the plate (300) so as to enable variation in height between a collapsed position, in which the segment (3) can be introduced under the vehicle, and a raised position in which it is used to lift the vehicle in such a way that its wheels are no longer in contact with the ground.

The range of motion is typically a few centimetres. The lifting bag, for example, consists of an inflatable envelope comprising two rectangular sheets of woven polyaramid. A pneumatic valve is inserted into a corner of the envelope.

Alternatively, the plate (300) is connected to the structure of the segment (3) by an extensible means such as an electric or hydraulic oil jack, with an articulated structure that can, for example, be deformed by a screw driven by an electric motor. In the same way, the assembly formed by the motorized block (1) and the segment (2) comprises a plate (200) mounted on a lifting bag or structure. The plate (200) is equipped with drive wheels (201, 202).

Alternatively, the assembly formed by the motorized block (1) and the segment (2) comprises drive wheels (201, 202) consisting of drive units as described in European Patent EP1795431. These drive units (201, 202) are provided with a steering motor comprising a steering motor shaft and a rotatable drive mechanism consisting of an electric motor, a gearbox and a brake. Alternatively, the segment (2) is combined with a pulling-pushing lift jack through a height adjustment mechanism.

In any case, the lifting mechanism controls the ground clearance of the first segment (2) so as to enable variation in height between a collapsed position, in which the segment (2) can be introduced under the vehicle, and a raised position in which it is used to lift the vehicle in such a way that its wheels are no longer in contact with the ground. The range of motion is typically a few centimetres.

The segment (3) forms a hollow casing having on each side a pair of arms (31, 33; 32, 34) articulated about pivots respectively (310, 330, 320, 340) between a position in which the arms are folded to hold a substantially longitudinal position, with an angle less than 20° with respect to the longitudinal axis, in order to reduce the width of the conveyor and allow for it to be introduced under the vehicle, between the wheels. In stowed position, the arms (31, 33, 32, 34) extend perpendicularly to the longitudinal axis. In this latter position, the inner edges of each arm rest against the tread of the car's tyre. When the lifting system is actuated, it causes the tyres to lose contact with the ground. The movement of the arms (21, 33; 32, 34) is handled by hydraulic, pneumatic or electric cylinders (311, 331; 321, 341).

The segment (2) also forms a hollow casing having on each side a fixed arm (21, 22) and a movable arm (23, 24) hinged about pivots respectively (230, 240) between a position in which the arms are folded to hold a substantially longitudinal position, with an angle less than 20° with respect to the longitudinal axis, in order to reduce the width of the conveyor and allow for it to be introduced under the vehicle, between the wheels. In stowed position, the arms (21, 23, 22, 24) extend perpendicularly to the longitudinal axis. In this latter position, the inner edges of each arm rest against the tread of the car's tyre. When the lifting system is actuated, it causes the tyres to lose contact with the ground. The movement of the arms (23, 24) is handled by hydraulic, pneumatic or electric cylinders (231, 241). The movement of segment (3) in relation to segment (2) allows for the conveyor to be adjusted to the wheelbase of each vehicle.

The invention claimed is:

1. An automatic parking system including at least one conveyor for moving a four-wheel vehicle, the at least one conveyor comprising:
   a frame provided with moveable arms that are rotatable between a position in which the arms allow moving the frame under the vehicle, and a position in which the moveable arms come into contact with treads of wheels of the vehicle;
   fixed arms laterally projecting from a portion of the frame in front of the moveable arms;
   the frame being telescopic and comprises two segments each carrying a pair of the arms, at least one of the pairs of arms being articulated to allow movement between an extended position perpendicular to a longitudinal axis of the frame with an extension at least equal to a vehicle track, and a folded-up position to occupy a width that is lower than a distance between inner sidewalls of the vehicle's wheels;
   the segments being movable between a position in which the moveable arms are not in contact with the wheels, and a position in which each moveable arm comes into contact with the tread of the wheels, to raise or lower the vehicle;
   at least one of the segments including a structure to which at least one of the pairs of arms are coupled, and a lifting mechanism configured to raise or lower the structure and thereby raise or lower the vehicle;
   ground-contacting rollers, casters or rails located below the frame inboard of all of the arms when the arms are in wheel-engaging positions;
   a front block coupled to the frame, the front block including a detector located at a vehicle bumper height;
   the front block enclosing drive wheels configured to roll on ground, an electric motor configured to control rotation of the drive wheels, a steering mechanism configured to steer the drive wheels, and a computer located in the front block;

a first actuator configured to pivot a first pair of the moveable arms between the extended position and the folded-up position;

a second actuator configured to pivot a second pair of the moveable arms between the extended position and the folded-up position; and a third actuator configured to move the second segment of the frame relative to the first segment of the frame along the longitudinal axis of the frame.

2. The automatic parking system of claim 1 wherein the computer operably controls haulage of the conveyor under a chassis of the vehicle, by a displacement of the conveyor along a longitudinal axis of the vehicle, then raising the vehicle by raising the segments and arms of the conveyor, then hauling the conveyor to a target location, and then releasing the vehicle by moving the moveable arms and removing the conveyor through a displacement along the longitudinal axis of the vehicle.

3. The automatic parking system of claim 2 further comprising:

a laser sensor configured to detect a position of a front pair of the wheels of the vehicle;

the detector including an ultrasonic sensor configured to detect a position of a bumper of the vehicle; and a force sensor configured to detect when objects contact the arms.

4. The automatic parking system of claim 1 wherein the computer is configured to:

control the first and second actuators to pivot the first and second pairs of moveable arms to their respective folded-up positions;

control the front block to align a longitudinal axis of the frame with a longitudinal axis of the vehicle based on the position of the front wheels;

control the front block to insert the frame underneath the vehicle by moving the conveyor a rearward direction from the front of the vehicle to the rear of the vehicle;

control the front block to stop movement of the conveyor along the longitudinal axis of the vehicle based on the position of the bumper;

control the second actuator to pivot the second pair of moveable arms to the extended position;

control the front block to move the conveyor in the rearward direction until the fixed arms contact the front wheels of the vehicle;

control the third actuator to move the second segment of the frame in the rearward direction relative to the first segment of the frame until the second pair of moveable arms contact rear wheels of the vehicle;

control the first actuator to pivot the first pair of moveable arms to the extended position to clamp the front wheels of the vehicle between the fixed arms and the first pair of moveable arms;

control the front block to haul the conveyor and the vehicle to the target location; and control the first and second actuators to pivot the first and second pair of moveable arms to their respective folded-up positions to release the vehicle.

5. The automatic parking system of claim 1 wherein the lifting mechanism includes a lifting bag which operably lifts the vehicle from a ground-to-wheel contacting position to a raised position where the wheels of the vehicle do not contact the ground.

6. A conveyor for moving a four-wheel vehicle, comprising:

a frame including a first segment and a second segment, at least one of the first and second segments including a structure, a plate, and a lifting bag disposed between the structure and the plate;

a first set of arms coupled to the first segment of the frame and configured to support front wheels of the vehicle;

a second set of arms coupled to the second segment of the frame and configured to support rear wheels of the vehicle, wherein the lifting bag is adjustable between a collapsible position, in which the second segment is insertable under the vehicle, and a raised position, in which the lifting bag lifts the vehicle from a ground-to-wheel contacting position to a raised position where the front and rear wheels of the vehicle do not contact the ground; and the lifting bag being located between opposite pairs of the second set of arms.

7. The conveyor of claim 6, further comprising wheels coupled to the plate and configured to roll on the ground.

8. The conveyor of claim 7, further comprising a drive mechanism configured to drive the wheels.

9. The conveyor of claim 7, further comprising a steering mechanism configured to steer the wheels.

10. The conveyor of claim 6, wherein the second segment of the frame includes the structure, the plate, and the lifting bag, and the lifting bag is located on a longitudinal centerline of the frame.

11. The conveyor of claim 6, wherein the first set of arms includes a front arm fixed to each side of the first segment of the frame and a rear arm pivotally coupled to each side of the first segment of the frame, the conveyor further comprising an actuator configured to pivot the rear arm relative to the frame.

12. The conveyor of claim 6, wherein the second set of arms includes a front arm pivotally coupled to each side of the second segment of the frame and a rear arm pivotally coupled to each side of the second segment of the frame, the conveyor further comprising an actuator configured to pivot the front and rear arms relative to the frame.

* * * * *